June 30, 1970  I. J. CALLAHAN  3,517,749

TWO-WAY PLOW ROLL-OVER MECHANISM

Filed March 9, 1967  3 Sheets-Sheet 1

INVENTOR
IRVIN J. CALLAHAN

BY Edmund M. Jaskiewicz
ATTORNEY

June 30, 1970  I. J. CALLAHAN  3,517,749
TWO-WAY PLOW ROLL-OVER MECHANISM
Filed March 9, 1967  3 Sheets-Sheet 2

INVENTOR
IRVIN J. CALLAHAN
BY Edmund M. Jaskiewicz
ATTORNEY

United States Patent Office 3,517,749
Patented June 30, 1970

3,517,749
TWO-WAY PLOW ROLL-OVER MECHANISM
Irwin J. Callahan, 107 11th Ave. N.,
Nampa, Idaho 83651
Filed Mar. 9, 1967, Ser. No. 621,919
Int. Cl. A01b *3/40*
U.S. Cl. 172—225       1 Claim

ABSTRACT OF THE DISCLOSURE

A roll-over mechanism for a two-way plow wherein a carrier frame, fixedly mounted on a tractor hitch, has a bracket upstanding from a tubular hub with a plow frame being pivotally mounted in the tubular hub and a hydraulic ram unit pivotally connected between the bracket and the plow frame by means of a lost motion connection on the plow frame so that retraction of the hydraulic ram unit will pivot the plow frame past its mid-position. There is also a mounting arrangement for a colter wheel whereby the colter may pivot through a limited angle and an arrangement for adjusting a gage wheel with respect to the plow frame.

---

The present invention relates to a two-way plow of the roll-over type, more particularly, to the actuating mechanism for pivoting the plow from one operating position to the other.

The two-way plow is pivoted through an angle of 180° to alternate the plow units from right to left hand plowing. When a tractor pulling such a plow is turned around at the end of a furrow and faces the opposite direction the plow is then pivoted through an angle of 180° so as to throw the dirt in the same direction as before the tractor was turned. The plow frame is provided with right and left hand plow units which are oppositely disposed from each other so that either unit may be positioned in plowing position merely upon pivoting of the plow frame.

Such plows are well known and it is customary to pivot the plow frame with a hydraulic ram or cylinder. Generally, the hydraulic cylinder is so positioned so that the extension stroke of the piston pivots the plow frame to one plowing position and the retraction stroke pivots the plow frame to its alternate position. Such an arrangement has not been particularly satisfactory since a cylinder was required which had a rather long stroke.

Such plows may also be provided with colter wheels positioned on the plow frame so as to be operable with both sets of plow units. The structures for mounting colter wheels have been generally unsatisfactory since they were rather cumbersome and complex.

A gage wheel is generally provided on each side of the plow frame so as to maintain constant the depth to which the plow units are plowing. Heavy and rather complicated structures have been previously provided for mounting the gage wheels on the plow frame in such a manner so as to be able to adjust vertically the respective gage wheel.

It is therefore the principal object of the present invention to provide a novel and improved actuating mechanism for a two-way plow of the roll-over type.

It is another object of the present invention to provide a two-way plow roll-over mechanism wherein both the extension and retraction strokes of a hydraulic cylinder are utilized to pivot the plow frame from one position to the other.

It is a further object of the present invention to provide a novel and improved arrangement for mounting a colter wheel on a plow frame.

It is an additional object of the present invention to provide a novel and improved arrangement for adjustably mounting a gage wheel on a plow frame of the roll-over type.

In one aspect of the present invention there is provided a carrier frame which is mounted upon the three point hitch of the tractor. The carrier frame is provided with a rearwardly extending tubular hub and there is a bracket extending upwardly from this tubular hub. A standard or plow frame has a cylindrical portion on its forward end rotatably received in the tubular hub for rotation about a longitudinal axis. Right and left hand plow units are mounted on the standard frame so that rotation of the frame disposes alternately these plow units in operating position. A hydraulic ram unit has one end pivotally connected to the bracket and its other end pivotally connected to the standard frame through a lost motion connection. The hydraulic unit is in its extended position when the standard frame is in one of its operating positions and in its retracted position when the standard frame is pivoted to the mid-position. The retraction of the hydraulic units will pivot the standard frame from one of its operating positions to the mid-position. As the standard frame approaches the mid-position, the inertia of the pivoting standard together with the lost motion connection between the hydraulic unit and the standard frame will cause the frame to move about 10° past the mid-position. At this point, the hydraulic cylinder is actuated so that extension of the hydraulic piston rod unit continues to pivot the standard frame to its other operating position.

The colter wheel is journaled on one end of a bracket which extends toward the leading edge of the colter wheel. A tubular element is provided on the free end of the bracket to receive a rod-like stem in such a manner that the bracket can pivot through an angle of about 20°. The rod-like stem is mounted in a tubular mounting member secured on the plow frame.

A gage wheel is mounted on each side of the standard frame by means of a shaft which is inserted into a mounting tube located on the plow frame and then locked into position. A rod-like guide shaft extends from the gage wheel shaft and has its end received in a second tubular member also mounted on the plow frame so as to stabilize the gage wheel assembly.

Other objects and advantages of the present invention will be apparent from the accompanying description when taken in conjunction with the following drawings wherein.

Proceeding next to the drawings wherein like reference symbols indicate the same parts throughout the various views a specific embodiment of the several features of the present invention will be described in detail.

Figure 1:
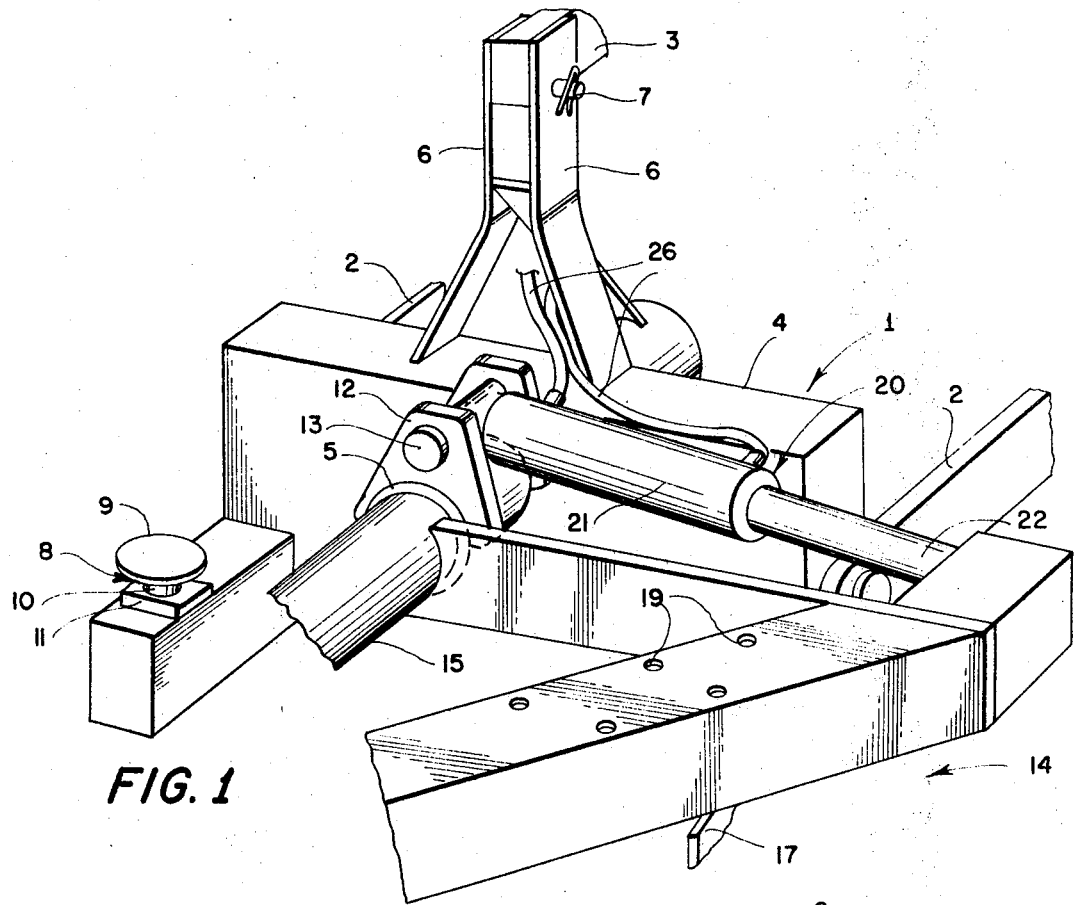
FIG. 1 is a perspective view showing the front of the standard frame and the carrier frame.
Figure 2:
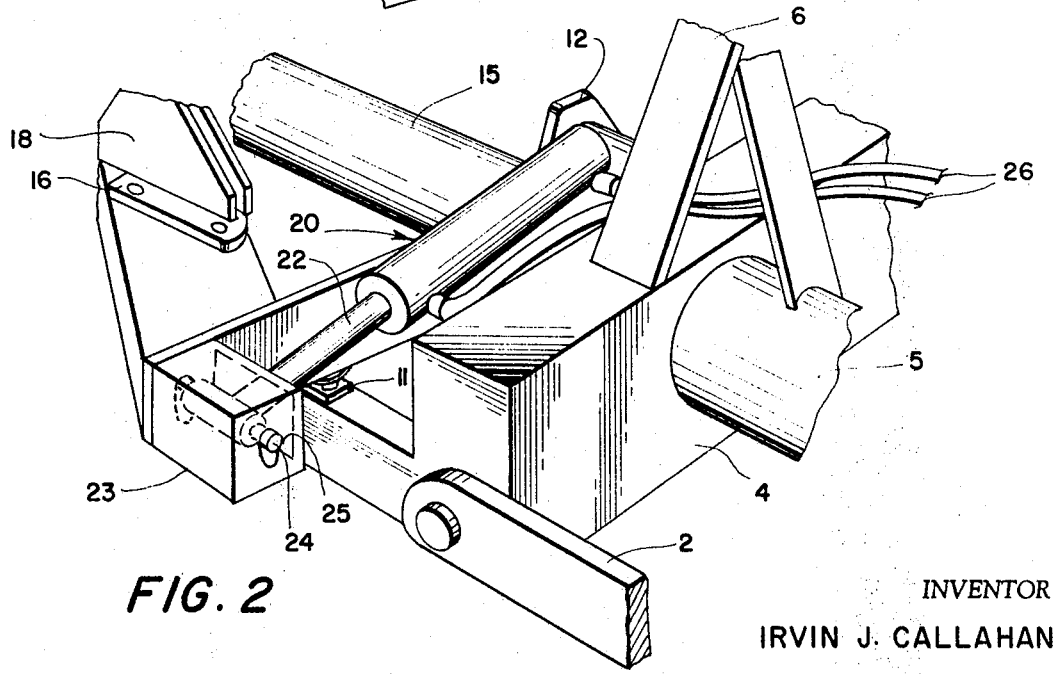
FIG. 2 is a perspective view looking at the front of the plow frame and showing the lost motion connection between the hydraulic unit and the plow frame.

As may be seen in FIG. 1, there is indicated generally at 1 a relatively stationary carrier frame of a two-way plow adapted to be mounted upon a tractor, not shown, and having implement connecting means therein such as a three point linkage represented by the laterally spaced lower links 2 and an upper link 3.

The carrier frame 1 includes a transversely extending base or body member 4 having a rearwardly extending tubular hub 5 mounted thereon and positioned generally longitudinally. The lower links 2 are connected to pivot pins mounted on carrier frame base 4 but not shown. A pair of standards 6 are mounted on the upper side of base 4 and are apertured at their upper end to receive a pivot pin 7 on which is mounted the rear end of upper tractor hitch link 3. Conventional means are provided on the tractor to which the implement is attached for raising and lowering the links and for vertically moving the implement between operating and transport positions.

Extending rearwardly from both ends of carrier frame base 4 are support members 8 upon which are mounted adjustable stop pads 9. The stop pads comprise a flat metallic member welded to the end of a bolt 10 which is then threaded into a corresponding hole in a support member 8. Lock nuts 11 are provided to maintain the stop pads in their adjusted positions.

A double bracket 12 is welded onto the tubular hub 5 and extends vertically upward therefrom to support a pivot pin 13 which is positioned vertically above the central longitudinal axis of tubular hub 5.

A standard or plow frame, indicated generally at 14, is mounted onto carrier frame 1 by means of a cylindrical portion 15 which is rotatably received within tubular hub 5. One or more right hand and left hand plow bottoms 16 and 17 are adjustably mounted on standard frame 14 by means of standards 18. The standards may be bolted into the holes 19 spaced on the standard frame as shown in FIG. 1. The standard frame may be pivoted about the longitudinal axis of tubular hub 5 approximately 180° alternately between right and left hand plowing positions.

The mechanism by which the standard frame is pivoted between its plow positions includes a hydraulic ram unit 20 having a cylinder 21 and a piston rod 22. The cylinder 21 is pivotally connected to the bracket pivot pin 13 and piston rod 22 is connected to a bracket 23 mounted on the carrier frame by means of a pin 24 which is received in a slotted opening 25 in bracket 23, thus providing a lost motion connection between the piston rod and the carrier frame.

The hydraulic ram unit 20 is double-acting and is supplied with fluid under pressure through hose lines 26 from a source of fluid under pressure on the tractor upon which the implement is mounted. Further, the hydraulic unit 20 is connected to a four-way control valve which is also generally provided on present-day tractors.

As may be seen in FIG. 1, the hydraulic unit 20 is in its extended position and the standard frame 14 is in one of its two plowing positions, namely resting upon a stop pad of the carrier frame. Since the pivot connection of the hydraulic unit to the bracket 12 is directly over the longitudinal axis of tubular hub 5, the standard frame will be in mid-position when the hydraulic unit is in its retracted position.

Figure 3:
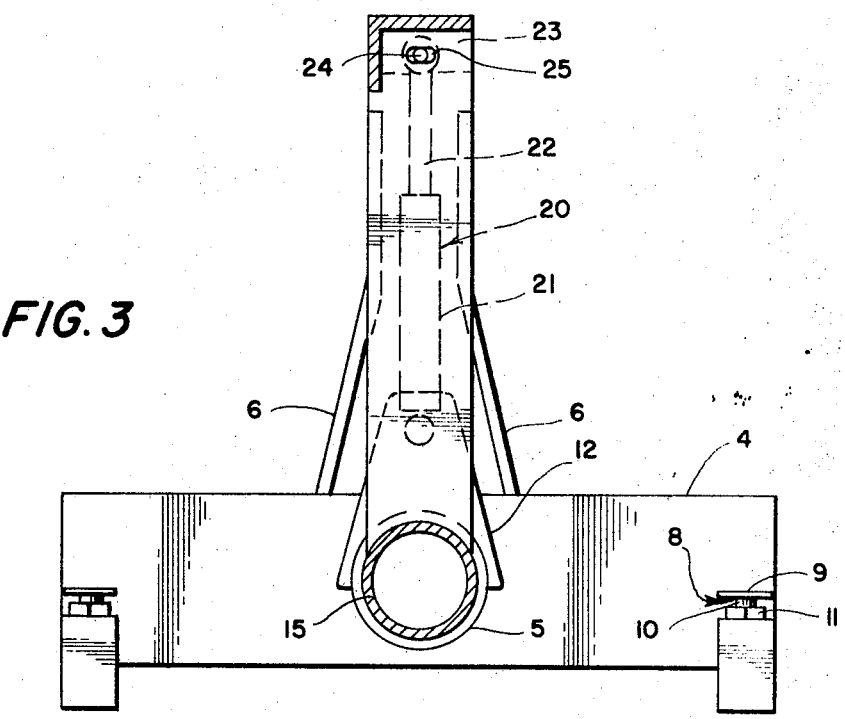
FIG. 3 is an elevational view of the carrier frame with the hydraulic unit in retracted position.
Figure 4:
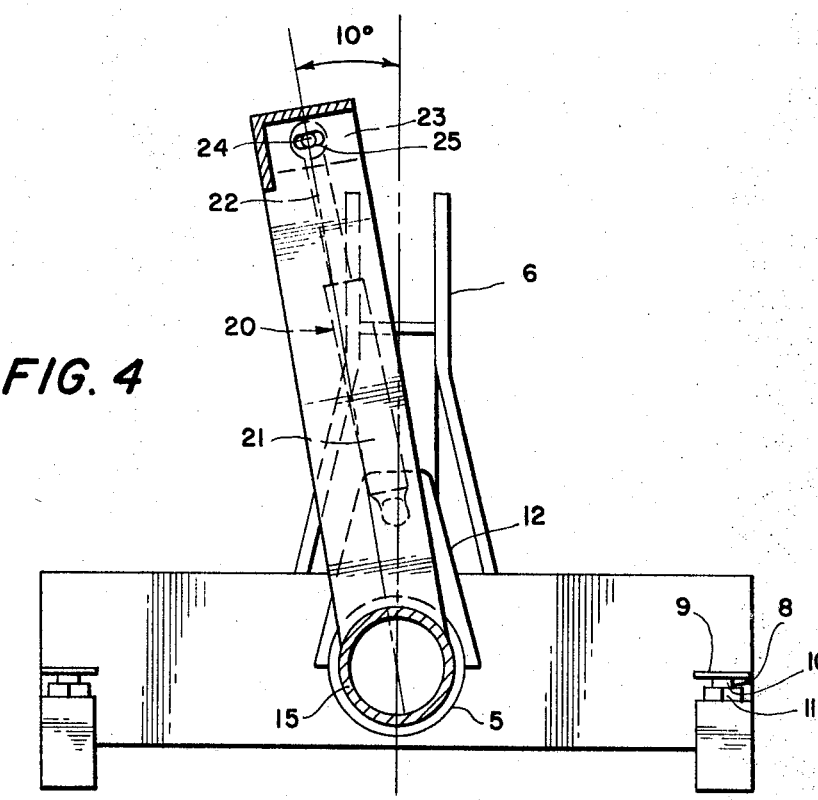
FIG. 4 is a view similar to that of FIG. 3 but showing the position of the plow frame with respect to the carrier frame because of the lost motion connection.

In the operation of the actuating mechanism of the present invention, when the standard frame is in one plowing position and it is desired to pivot the frame to the other plowing position, the tractor operator actuates the control valve to retract the hydraulic unit 20. When the unit comes to its completely retracted position, as shown in FIG. 3, the plow frame will be in mid-position. However, because of the lost motion connection between the hydraulic unit and the bracket 23 of the plow frame, the inertia of the pivoting plow frame will carry the frame to a position approximately 10° beyond the 90° mid-position. At this point, the operator reverses the flow of hydraulic fluid with the control valve on the tractor and the hydraulic unit extends to pivot the plow frame through the remaining 80° to its other operating or plow position. In this position, the plow frame will rest upon the stop pads as described above. The hydraulic fluid locked within the cylinder of the hydraulic unit will hold the piston rod of the cylinder in extended position and thus maintains the standard frame upon its respective stop pad until such a time that the operator actuates the control valve to pivot the plow frame to its opposite plowing position.

The operation of the mechanism will be the same regardless of the direction in which the plow frame is pivoted. Thus, both the retraction and extension of the hydraulic unit is used to move the plow frame from one plowing position to the other.

Figure 5:
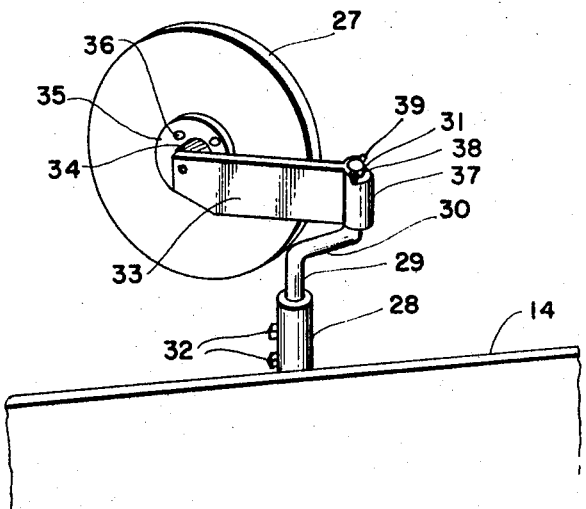
FIG. 5 is a perspective view of the colter wheel arrangement on one side of the plow frame.

Proceeding next to FIG. 5, there is illustrated an arrangement for mounting a colter wheel 27 onto the standard frame 14. This is achieved by welding or otherwise affixing a tubular mounting member 28 onto the plow frame and inserting a rod-like stem 29 into the mounting member. The stem is bent in two directions to form a forwardly extending portion 30 and downward portion 31. Set screws 32 may be used to lock the stem within the tubular member.

The colter wheel is mounted upon the stem by means of a bracket 33 having a spindle and hub arrangement indicated at 34 and including a disk 35 upon which the wheel is bolted by lug bolts 36.

The bracket 33 extends forwardly of the leading edge of colter wheel 27 and has a tubular element or socket 37 into which is inserted the downward portion 31 of the stem. The forward portion of the lower end of tubular element 37 is notched at 38 through an angle of about 200° and receives a transverse pin 39 fastened in the end of the stem. With this arrangement, the colter wheel may pivot about 10° to either side.

In the spindle and hub arrangement 34, the hub is provided with double bearings and a seal for the lubricant so as to require a minimum of maintenance.

Figure 6:
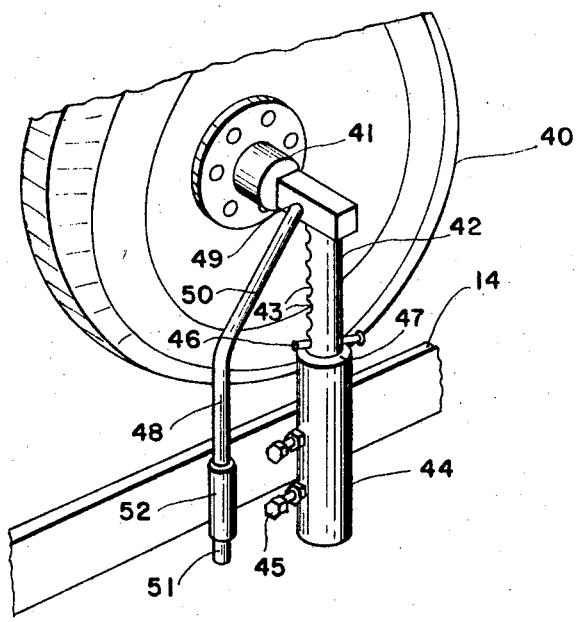
FIG. 6 is a perspective view showing the mounting of a gage wheel on one side of the plow frame.

Proceeding next to FIG. 6 there is illustrated an arrangement for mounting a gage wheel 40 on one side of the standard frame 14. The gage wheel assists in maintaining constant the depth to which the plow units plow. The gage wheel 40 is mounted on a spindle 41 welded or otherwise affixed to the lower end of a shaft 42 having a series of vertically spaced openings 43 therein. The other end of shaft 42 is lockingly retained within a mounting tube 44 welded to the standard frame 14. The shaft is secured within the mounting tube by set screws 45. A pin 46 is passed through one of the openings 43 and bears against the lower edge 47 of the mounting tube to position vertically the shaft and the gage wheel mounted thereon.

In order to stabilize and strengthen the gage wheel assembly, there is provided a guide shaft 48 which is a rod-like member having one end 49 welded to the spindle 41 and bent at 50 so that its other end 51 is received within a tubular member 52 also mounted on the standard frame and spaced from mounting tube 44. The shaft openings 43 are approximately 1″ apart so that the operator can easily gage the depth of the gage wheel. The use of the pin 46 also takes some of the strain from set screws 45.

The gage wheel 40 is mounted on a conventional type hub having double roller bearings, seal and hub cap. In one embodiment the gage wheel comprised a 12″ wheel with a pneumatic tire mounted thereon.

The gage wheel assembly as described above is very simple in construction but is sufficiently strong to maintain the gage wheel in its adjusted position with a high degree of accuracy.

Thus it can be seen that the present invention has provided a simple yet effective actuating mechanism for pivoting a two-way plow through an angle of 180° from one plowing position to another plowing position. The use of a lost motion connection between the hydraulic ram unit and the standard frame greatly simplifies the connecting structure between the stationary carrier frame and the pivotable standard frame. As a result of this structure, a hydraulic ram unit with a relatively short stroke may be employed with both the extension and retraction operations of the hydraulic unit being employed to pivot the standard frame from one plowing position to the other.

It is understood that this invention is susceptible to modifications in order to adapt it to different usages and conditions.

What is claimed is:

1. In a two-way plow of the roll-over type, a carrier frame having a rearwardly extending tubular hub, a bracket extending upwardly from said carrier frame, a plow standard frame having alternately operable right and left hand plow units thereon and including a cylindrical portion rotatably received in said tubular hub for rotation about a longitudinal axis to dispose alternately said plow units in operation, a double-acting hydraulic ram unit having a cylinder and a piston rod, said cylinder having its free end pivotally connected to said bracket, said piston rod having its free end pivotally connected to said plow standard frame by a lost motion connection means comprising a pin rigidly secured to said free end of the piston rod and an elongated slot in said plow frame, said slot elongation arranged perpendicular to the axis of said piston rod with said pin being freely and slidably received in said slot, said pin operatively engaging one end portion of the slot when said piston rod is extended and said plow standard frame is in one operating position, and said piston rod being retractable upon actuation of the hydraulic ram to raise the plow standard frame about said bracket to a mid-position point, said pin being free to move relative to said slot as the plow frame moves past the mid-position point independently of the operation of the hydraulic ram unit, and said hydraulic ram unit being selectively operable to extend the piston rod after the plow standard frame moves past its mid-position point to move the plow standard frame to the other operating position.

References Cited

UNITED STATES PATENTS

| 3,174,556 | 3/1965 | Knapp et al. | 172—225 X |
| 3,311,176 | 3/1967 | Cleland | 172—225 |
| 3,386,518 | 6/1968 | Mellen | 172—225 |
| 3,428,135 | 2/1969 | Richey | 172—225 |

FOREIGN PATENTS 807,853   1/1959   Great Britain.

ROBERT E. PULFREY, Primary Examiner

S. C. PELLEGRINO, Assistant Examiner

U.S. Cl. X.R.

172—501